United States Patent [19]

Lefroy et al.

[11] Patent Number: 5,766,302
[45] Date of Patent: Jun. 16, 1998

[54] FERTILIZER COATING PROCESS

[76] Inventors: Roderick David Bruce Lefroy, 1/176 Allingham Street, Armidale NSW 2350, Australia; Graeme John Blair, "Nioka", Dumaresq, Armidale NSW 2350, Australia

[21] Appl. No.: 549,739

[22] PCT Filed: May 9, 1994

[86] PCT No.: PCT/AU94/00238

§ 371 Date: May 20, 1996

§ 102(e) Date: May 20, 1996

[87] PCT Pub. No.: WO94/26680

PCT Pub. Date: Nov. 24, 1994

[30] Foreign Application Priority Data

May 7, 1993 [AU] Australia ................... PL8707

[51] Int. Cl.6 ................. C05C 4/00; C05B 7/00; A01N 25/00
[52] U.S. Cl. ............... 71/28; 71/34; 71/64.02; 71/64.07; 504/101
[58] Field of Search ................. 71/28, 33, 34, 71/64.02, 64.03, 64.07, 64.13; 504/101

[56] References Cited

U.S. PATENT DOCUMENTS 4,369,055 1/1983 Fujita et al. ................. 71/64.11

FOREIGN PATENT DOCUMENTS

| A4978985 | 11/1985 | Australia. |
| 9206056 | 4/1992 | WIPO. |
| 9214690 | 9/1992 | WIPO. |
| 9215538 | 9/1992 | WIPO. |

Primary Examiner—Ferris Lander
Attorney, Agent, or Firm—Dority & Manning, P.A.

[57] ABSTRACT

A process for coating fertilizer granules in which a mixture of adhesive and additive is provided and the particles of the additive in the adhesive are ground to a desired size. The mixture of adhesive and ground additive is then applied to the surface of the fertilizer granules and agitated to evenly coat the granules without agglomeration. Either subsequently or in combination with the agitating the adhesive in the coating is dryed without agglomeration. The additive/adhesive mixture may be applied to the fertilizer granules by any method such as mixing in a stirred vessel or spraying.

16 Claims, 2 Drawing Sheets

FERTILIZER COATING PROCESS

This application is a 371 of PCT/AU94/00238, May 9, 1994.

TECHNICAL FIELD

The present invention relates to a process for coating fertilizer granules and more particularly to a process for binding additives such as nutrients, herbicides, pesticides, ion exchange agents etc. to the fertilizer granules.

BACKGROUND ART

Different agriculture systems have different demands with regard to fertilizers. All plants require a balanced supply of macronutrients and micronutrients that are essential for healthy plant growth. The total amount of each nutrient, the balance of nutrients and the time at which different nutrients are required varies for different plant species. In addition, the ability of soils to provide both the amount and balance of nutrients varies enormously. Climate also dictates not only the crop species which may be grown but also their growth rate and potential yield and, accordingly, the total nutrient demand. When ascertaining the nutrient requirements of different agricultural systems, therefore, the combination of plant species, soil type and climate must be considered. In some cases, it is also necessary to consider the nutritional requirement of animals since the nutrient demand of these animals in a system may differ slightly from the requirements of the plants in that system.

The effective and efficient use of fertilizers, therefore, is essential not only to give a balanced nutrient supply but also minimise the cost of the fertilizer relative to total farm income. By tailoring fertilizer input to nutrient demand, the farmer reduces the possibility of wasteful and costly over-fertilization as well as reducing the environmental impact of inappropriate fertilizer use, particularly the impact on ground and river water quality.

Substantial benefits may be gained by improving the precision with which the plant/soil nutrient requirements are matched with the fertilizer applications. This precise matching may not be done by simply mixing standard products.

As information on the ability of different soils to provide nutrients and the nutrient demand of different plant species continues to improve, the ability to predict the nutrient demand of a particular agricultural system has also improved. As the precision in matching fertilizer supply to plant requirement has increased, so the demand for a greater number of multi-nutrient fertilizer products has increased.

Normally, the demand for different fertilizer products will be regionally based since, as one would expect, it is the local soil, climate and agricultural systems which will dictate the particular fertilizer requirements It is, therefore, preferable that the manufacture of the particular fertilizer product is as near to the point of use as possible.

There are many fertilizer products currently available. World trade is dominated by a few products, however, including urea, diammonium phosphate, monoamonium phosphate, triple superphosphate and potassium chloride. These single or di-nutrient products may be used individually or combined with other additives. These products, or the raw materials from which they are made, may be used often in conjunction with minor fertilizer products, to manufacture or blend multi-nutrient fertilizers.

In the fertilizer industry, there are also many methods for coating granules with particular additives. These methods usually involve a chemical reaction between the chemical compounds in the granules to be coated and the additives to be affixed to the granules. These methods, however, are specific to certain fertilizers and certain additives so that the desired chemical reaction may occur. The coating process is designed such that there is a chemical interaction of the chemical constituents in the granules with the chemicals employed in the establishment of the coating and some of the nutrients to be incorporated into the coating, thereby ensuring that the coating is an intimate part of the original granule.

Oil and wax have also been used to stick nutrients onto the surface of fertilizer granules but the aliphatic and hydrophobic nature of the compounds prevents them from establishing a tenacious coat on the surface of the fertilizer granules.

Other methods for coating granules involve using binders to attach nutrients to fertilizer granules. For example, U.S. Pat. No. 3,353,949 to American Cyanamid Company discloses a method for preparing a coated granular fertilizer wherein the finely divided nutrient particles are mixed with the granular fertilizer and an aqueous solution of conditioner is added and mixed until adhesion of the nutrient to the fertilizer is attained. Similarly, in U.S. Pat. No. 3,938,469 a falling curtain of granular fertilizer is sprayed with a binder and then mixed with the finely divided nutrient particles.

These methods, however, have several disadvantages. Firstly, it is difficult to precisely estimate the amount of nutrient which will "stick" to a fertilizer granule, particularly if the nutrient has large particles.

In addition, it is difficult using the prior art processes to obtain a fertilizer granule with sufficient nutrient coating from which nutrient is easily released to the plant. To explain, if it is desired to coat the fertilizer granules with say sulphur, in order to include sufficient sulphur in a single coating, large particles of sulphur must be used.

The oxidation rate of elemental sulphur in the soil is inversely proportional to its particle size. In other words, in those cases where it is desirable to obtain a relatively rapid release of the elemental sulphur into the soil, the sulphur must be ground to a fine particle size. Dry grinding of elemental sulphur, however, needs to be done under an inert atmosphere to reduce the risk of explosion. Similarly, dry grinding of other additives may produce fine particles which pose a significant health risk, especially when inhaled.

Accordingly, the present invention seeks to provide an improved fertilizer coating process which offers a choice over the prior art and which, at least in the preferred embodiments, allows a fertilizer to be precisely tailored to suit the local soil, climate and plant nutrient demand.

DISCLOSURE OF THE INVENTION

In a first aspect, the present invention comprises a process for coating fertilizer particles comprising the steps of:
  (a) mixing a water soluble adhesive with a desired additive;
  (b) wet grinding particles of the additive in the adhesive to a desired size;
  (c) applying the mixture of the adhesive and the wet ground additive to the surface of the fertilizer particles;
  (d) agitating the fertilizer particles to evenly coat them with the mixture without agglomeration; and
  (e) drying the adhesive in the coating, without agglomeration.

Application of the mixture of adhesive and ground additive to the fertilizer may be accomplished by any suitable technique. One particularly preferred technique is to provide a stirred vessel in which the adhesive/additive mixture and fertilizer granules are mixed in appropriate proportions. Alternatively, the fertilizer granules may be sprayed with the adhesive/additive mixture.

The present invention allows fertilizer products to be tailored to fit local demands by coating particles of fertilizer with any desired amount and number of additives. A wide range of types and amounts of additives may be incorporated in the fertilizer coating including different fertilizers, ion exchange agents, herbicides, pesticides, etc. The mixture used for the present inventive process comprises a suspension of additive, wet ground in a water soluble adhesive. In addition to the wet ground additive other materials may also be included in the mixture, for example dry ground or other particulate additives and/or additives which are soluble in the adhesive.

These other constitutents may also be applied to the fertilizer particle in mixtures which do not include the wet ground additive.

By incorporating the additives into the adhesive prior to application on the fertilizer particle, the coating is tenacious enough to withstand the physical treatment encountered during transport while releasing the nutrients for plant uptake once supplied to the soil. This is particularly true when soil conditions of temperature and moisture are conducive to plant growth.

The present inventive method is also safe to operate. This is particularly important when hazardous materials such as fine elemental sulphur are included in the coating. As mentioned above, dry grinding of elemental sulphur may lead to an explosion and therefore needs to be done under an inert atmosphere to reduce the risk of an explosion. This requires significant capital investment which may not be available for a small local operation. Wet grinding is a safe and relatively inexpensive method whereby the elemental sulphur is ground in a liquid. With the present inventive process, an additive, for example coarse elemental sulphur in the form of flakes, is mixed with the adhesive, wet ground to the desired particle size and applied to the fertilizer particle.

Other additives, whilst not explosive and therefore as hazardous as elemental sulphur, may produce fine particles when dry ground and these particles may pose significant health risks, especially when inhaled. Wet grinding will also reduce these risks.

The present inventive process is also cost effective since the cost of coating the fertilizer particles represents a very small percentage of the cost of the final product.

As mentioned above, the fertilizer particles may be coated with a plurality of layers of the same or a different mixture of adhesive and additive. If more than one layer of mixture is applied to the fertilizer, it is preferred that an agitating and/or heating step is provided between the application of each mixture layer in order to assist adhesion of a subsequent layer of mixture. It should also be understood that the inventive process does not apply only uncoated fertilized particles. The inventive process may equally be applied to a fertilizer particle already coated with a mixture of adhesive and a particular additive.

There are many types of fertilizer particles which may be used with the present inventive process. Granules or prill of urea, diamonium phosphate, monoammonium phosphate and triple superphosphate are particularly suitable. The additive(s) which may be incorporated in the mixture for coating of the fertilizer particle may include nutrients such as elemental sulphur, molybdenum, copper, zinc, boron, iron, manganese, cobalt, selenium, magnesium, calcium and potassium, ion exchange agents such as zeolite, which may prevent the loss of plant available nutrients, particularly of ammonium, and/or control their rates of release to plants, and the addition of other agricultural chemicals such as herbicides and pesticides. These additives may form a solution or a suspension with the adhesive. The total amount of additive is preferably 0.1% to 30% by weight of a final product more preferably 0.5% to 20% by weight and most preferably 0.5% to 10% by weight.

The adhesive of the present inventive process is water soluble and selected such that the additive(s) will be readily released into the soil. Particularly preferred adhesives are alkali metal lignosulphonates and polyvinyl alcohol. Neutralised alkali metal lignosulphonate liquor, a by-product of the sulphite process used in paper production, is a particularly preferred adhesive for several reasons. It is an effective adhesive which is also easily available and relatively inexpensive. Also, neutralised alkali metal lignosulphate liquor may be easily mixed with additives. This is important when elemental sulphur is provided as an additive since elemental sulphur mixes easily with neutralised alkali metal lignosulphate liquor but is not easily mixed with water or many water based solutions.

As outlined above, the coating technique of the present invention is particularly advantageous when elemental sulphur is used as an additive. Elemental sulphur may be hazardous to handle as fine particles can result in explosions with fire producing very toxic fumes. The larger the particles size of the elemental sulphur, the lower the risk of explosion. Unfortunately, even coarse elemental sulphur may produce enough fine particles during transportation to be a hazard.

To be effective as a fertilizer, elemental sulphur must be in the form of relatively fine particles since elemental sulphur must be oxidized to sulphate before it can be used by plants. Oxidation is carried out by soil bacteria such as *Thiobacillus thiooxidans*. The rate of oxidation is controlled by the parameters which control the population of the bacteria, such as temperature, moisture, pH, aeration and nutrition. Oxidation is also inversely related to the surface area and particle size of the elemental sulphur. To safely reduce its particle size, the elemental sulphur is mixed with the adhesive, such as lignosulphate liquor, prior to grinding.

As previously discussed, the oxidation rate of the elemental sulphur in the soil is inversely related to particle size. The present invention allows the particle size to be safely manipulated to control the rate of release of the sulphur or other additives from the coated fertilizer granule or prill so as to match the demand of the particular crop, climate and soil type.

Many additives, other than elemental sulphur also require grinding prior to coating on fertilizer particles. The evenness with which an additive is coated on fertilizer particles is, to a point, correlated with the fineness of the material. Wet grinding of most additives will reduce the health risks associated with dust, even when the dust is not explosive.

The present invention is also directed to a coated fertilizer particle produced by the aforementioned inventive process.

BRIEF DESCRIPTION OF THE DRAWINGS

In order that the nature e of the present invention may be more clearly understood a preferred embodiment of the present invention will now be described, by way of example only, with reference to the accompanying drawings, in which.

MODE(S) FOR CARRYING OUT THE INVENTION

Figure 1:
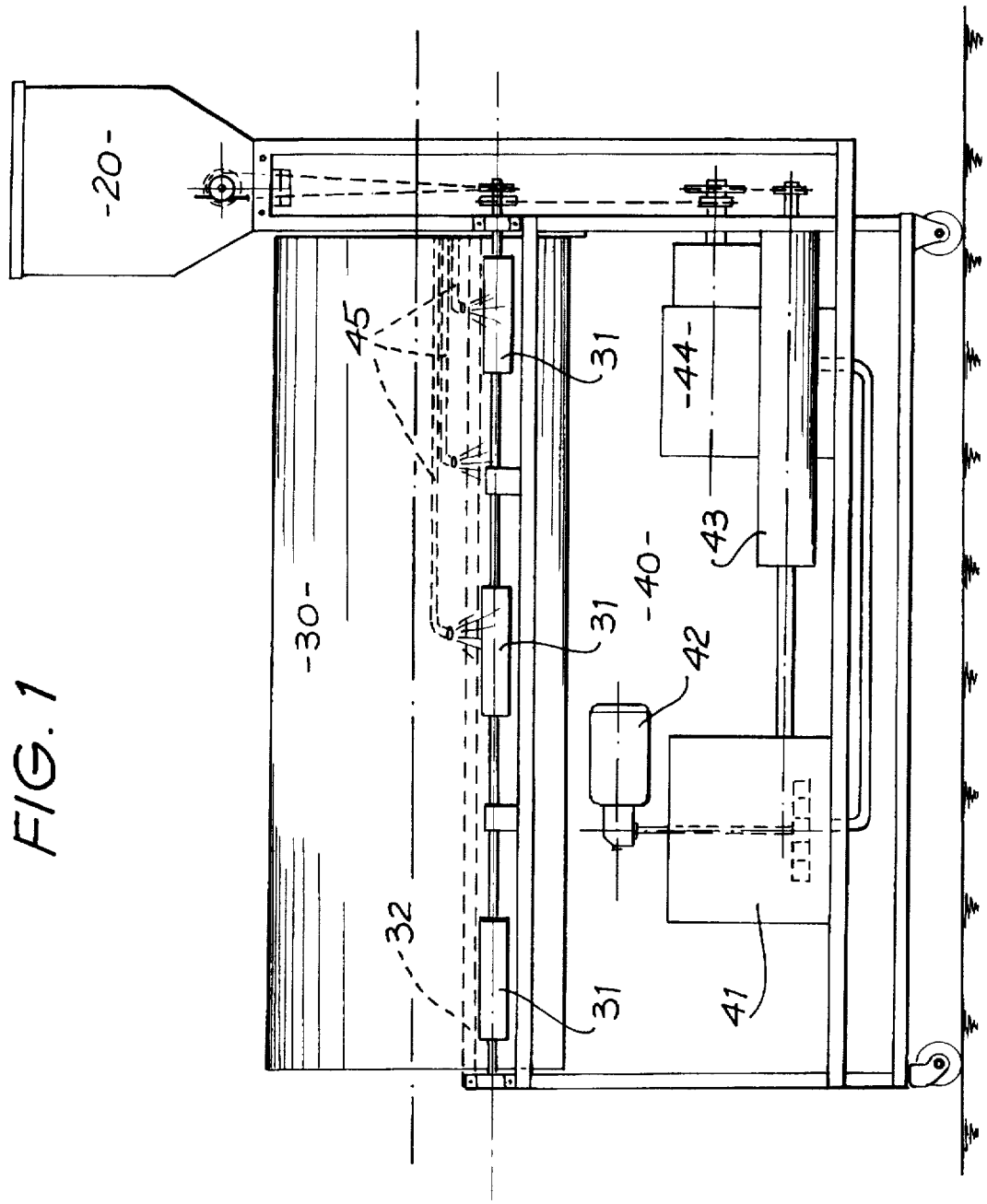
FIG. 1 is a side elevational view of an apparatus for carrying out the process of the present invention.
Figure 2:
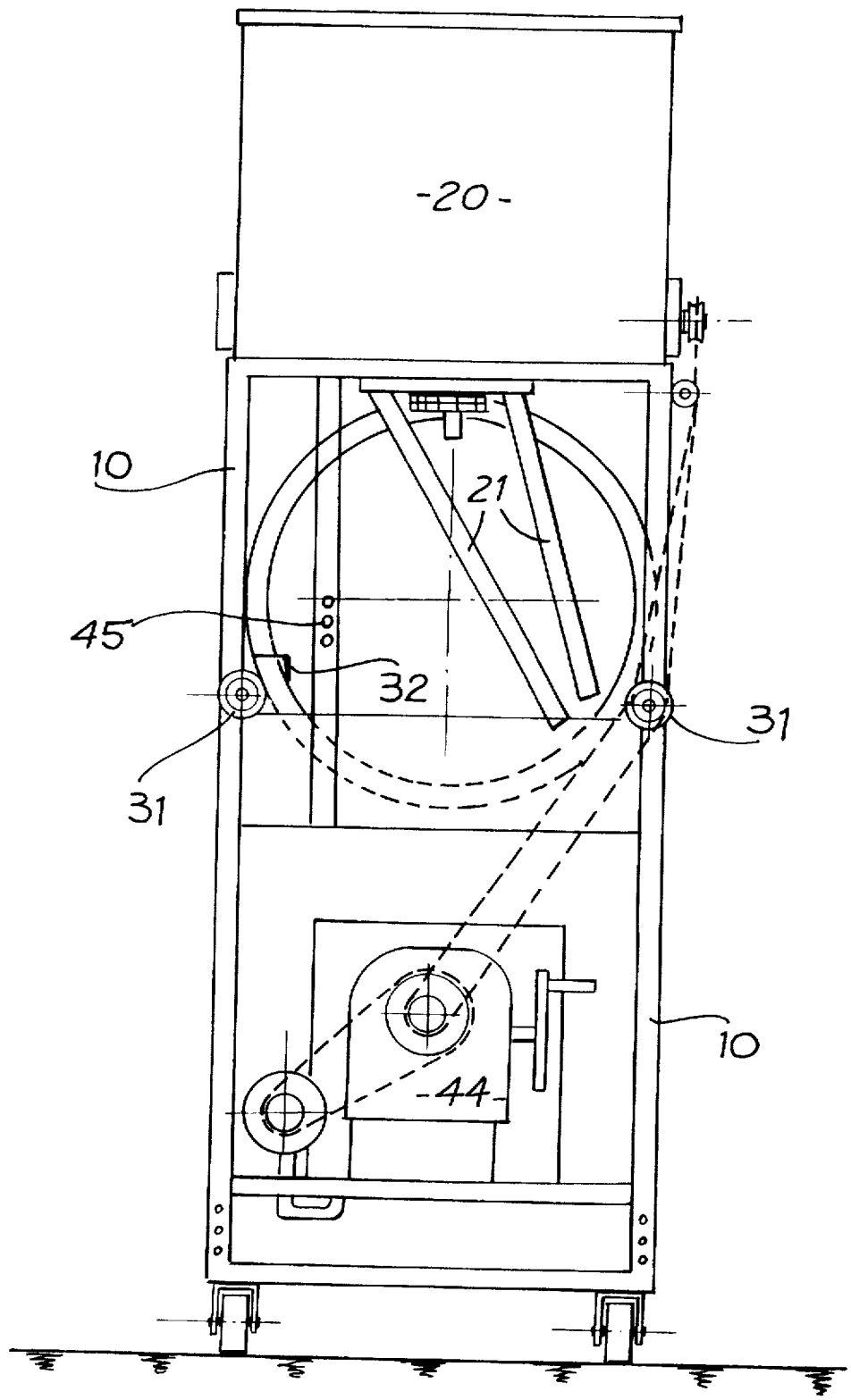
FIG. 2 is an end elevation of the apparatus of FIG. 1.

The apparatus shown in FIGS. 1 and 2 comprises frame 10 supporting coater drum 30 on an upper tier, a mixing means 40 on a lower tier and a hopper 20 above the entry to the coater drum 30.

In use, hopper 20 is filled with fertilizer particles, such as granules or prill, which are fed under gravity to coater drum 30 by feeder tubes 21 (see FIG. 2).

Mixing means 40 positioned on the lower tier comprises mixing tank 41 which contains the mixture of adhesive and ground additive. A stirrer 42 is preferably provided to prevent settling of the ground additive in the adhesive. Mixing means 40 also includes recirculating pump 43 which is connected to a variable speed motor 44. This recirculating pump also ensures the mixture of adhesive/ground additive remains homogeneous.

Variable speed motor 44 is also connected by belt drive to rollers 31 positioned on either side of drum 30. The drum 30 is tilted slightly downwards towards its exit so that as it is rotated by rollers 31, the fertilizer granules move from the entry toward the exit. Multiple sprayers 45 are positioned at the leading end of drum 30 to spray the adhesive/ground additive mixture on the fertilizer granules as they pass along drum 30.

Drum 30 also preferably includes a scraper bar 32 which separates granules from the interior wall of drum 30.

Operation of the apparatus shown in FIGS. 1 and 2 will now be described by way of example only, with reference to a process for coating triple superphosphate granules with elemental sulphur. The final product consists of 10% elemental sulphur.

Firstly, flakes of elemental sulphur are mixed with neutralised sodium lignosulphate liquor and ground until the elemental sulphur in suspension passes through a 150 micron sieve but does not pass through a 50 micron sieve. The ratio of liquor to elemental sulphur depends upon the initial size of the elemental sulphur being ground, with the excess liquor being recycled. The final mixture used for spraying on the granules, may have a ratio of 7:5 (w/w) of elemental sulphur to liquor. This mixture is placed in mixing tank 41.

Triple superphosphate granules are placed in hopper 20 and fed under gravity to drum 30. By way of example only, drum 30 may comprise a 60 cm diameter, thick wall (15 mm) polyethylene cylinder 2 meters in length. Drum 30 is preferably rotated at approximately 20 r.p.m. on a slight incline (4 degrees) downwards from horizontal. The triple superphosphate is fed to drum 30 at a rate of approximately 10 kg/minute.

The stirrer 42 and recirculating pump 43 are activated to ensure a homogeneous adhesive/additive mixture and the mixture is sprayed onto the fertilizer granules as they pass along drum 30. Preferably, sprayers 45 are positioned approximately ⅙th of a rotation in the direction of rotation from vertically downwards. The first sprayer is preferably approximately 10 cm from the entry of drum 30. The sprayers are preferably supplied by individual peristaltic pump tubes. The variable speed motor 44 preferably drives drum 30, solid feeder 20 and the recirculating pump 43 as shown in FIGS. 1 and 2.

It is important that drum 30 is rotated at such a speed that the coated granules are agitated to allow an even coat of the mixture to be applied to each granule without agglomeration. In order to assist such agitation, drum 30 includes a scraper bar 32 positioned adjacent its interior wall. As drum 30 is rotated, the coated granules rise up and contact scraper bar 32 which disengages the coated granules from the interior wall of drum 30 to roll the coated granules downwardly toward the bottom of drum 30. This continual turning over of the fertilizer granules provides the granules with an even coat of adhesive/additive mixture without agglomeration of the granules.

As the coated granules continue along drum 30, they are coated again with second and third additions of the same or a different adhesive/additive mixture by sprayers positioned 50 and 90 cm from the entry of drum 30. The rate of application of a slurry in the three sprayers is adjusted to give approximately 135 ml/kg triple superphosphate.

It will be understood that sprayers 45 may use the same or different additives to coat the fertilizer granules. A different mixing tank may be used to supply each sprayer. After each coating, the fertilizer granules are agitated to ensure an even coat without agglomeration.

Once the desired number of coatings have been applied to the fertilizer granules, agitation of the granules is continued for the remaining length of drum 30. During this farther agitation some of the water in the adhesive evaporates off and some is absorbed by the fertilizer so that the adhesive in the mixture substantially dries without agglomeration of the coated granules.

Heat may be applied to the coated granules to assist in drying of the adhesive if drum 30 is not of sufficient length. The coated granules may also be allowed to dry naturally with no additional heating. Of course, such a separate drying step may be unnecessary if for example, the drum 30 is longer than 2 m or another means to maintain agitation of the coated granules is provided.

An alternative to the abovementioned embodiment involves applying the adhesive/additive mixture to the fertilizer granule by means of a mixing vessel. In this embodiment, a mixing vessel (such as a blunger), is fed an adhesive/additive mixture and fertilizer granules, in appropriate proportions to each other. If the additive requires grinding prior to coating on the granule, the adhesive/additive mixture can be delivered to the mixing vessel directly from a wet grinder and the fertilizer granules delivered from a hopper. The use of such a stirred vessel allows a much higher ratio of additive to adhesive as compared with the aforementioned spraying embodiment. After the fertilizer granules have been mixed with the adhesive/additive mixture in the stirred vessel, the granules are fed to a rotating drum similar to drum 30 shown in FIGS. 1 and 2. This drum agitates the fertilizer granule/mixture to ensure even coating without agglomeration. Due to the higher ratio of additive to adhesive in the mixture, the amount of drying required in drum 30 is reduced. This embodiment makes possible the application of larger amounts of additive in the mixture coating.

With the aforementioned "spraying" process, hot air may be used to dry the coated granules. This not only adds expense to the process but increases the risk of ignition of any sulphur particles in the coating. The aforementioned alternative "mixing" embodiment allows one to increase the ratio of additive to adhesive in the coating mixture. For example, the preferred ratio of sulphur to lignosulphonate is 2:1 (w/w), wherein the lignosulphate used is a mixture of 90% water, 3% lignosulphonate and 7% other solids by weight. In this way, less water is used than the aforementioned "spraying" embodiment and, as some water is evaporated off during the agitating stage through drum 30 and some is absorbed into the granules, the end result is a reduction in the need for heating to dry the coated granules. Indeed, as mentioned above, if the agitation continues for a sufficient time and/or the additive/adhesive ratio is high no separate drying step may be required at all.

It is also possible to combine the "mixing" and "spraying" embodiments. For example, one may first mix the fertilizer granules with the additive/adhesive mixture in a blunger and then spray the coated granules with the same or a different mixture of adhesive and additive.

In all these embodiments, the additive and the adhesive can be mixed and ground to the required size range prior to mixing with or spraying on the fertilizer granules in an appropriate grinder or mill.

INDUSTRIAL APPLICABILITY

The present invention provides a process for coating fertilizer granules which is safe, relatively inexpensive to use and which allows an operator to specifically tailor fertilizer products to fit local demands.

The coating provided by the present inventive method strongly binds to the fertilizer products and the fertilizer granules/products produced by the inventive process have shown goods results when testing their ability to release nutrients to plants.

The present inventive process may be used to produce a range of products. Urea, diammonium phosphate and monoammonium phosphate granules have been used instead of triple superphosphate. These products may be coated with, for example, a 10% coat of elemental sulphur, mixed coats of 10% elemental sulphur plus 10% zeolite, successive coats of 5% zeolite followed by 10% elemental sulphur and 10% zeolite followed by 10% elemental sulphur.

Further, while neutralized sodium lignosulphate waste liquor has been found to be quite effective in terms of physical tenacity, agronomic availability and cost, the present inventive process may use several different types and amounts of adhesives.

From the foregoing, it should be apparent that the present invention encompasses an advantageous advance in the art or at least a commercial alternative to the prior art. Further, it should be clear that the present invention may be embodied in other specific forms without departing from the spirit or scope or the essential characteristics thereof. The present embodiment is to be considered in all respects as illustrative and not restrictive.

We claim:

1. A process for coating fertilizer particles comprising the steps of:
   (a) mixing a water soluble adhesive with a desired additive;
   (b) wet grinding particles of the additive in the adhesive to reduce the particle size of the additive;
   (c) applying the mixture of the adhesive and the wet ground additive to the surface of the fertilizer particles;
   (d) agitating the particles to evenly coat them with the mixture without agglomeration; and
   (e) drying the adhesive in the coating without agglomeration wherein the adhesive comprises an alkali metal lignosulphonate, a polyvinyl alcohol or mixtures thereof.

2. A process as claimed in claim 1 in which the mixture, in addition to the wet ground additive, contains a material selected from the group consisting of additives which are soluble in the adhesive, other particulate additives and mixtures thereof.

3. A process as claimed in claim 1, wherein the fertilizer particles are coated with a plurality of layers of said mixture of adhesive and additive.

4. A process as claimed in claim 3, wherein an agitating and/or heating step is provided between applying each layer of the mixture.

5. The process as claimed in claim 1, wherein the fertilizer particles are coated with a plurality of layers, said layers being comprised of different mixtures of an adhesive and an additive.

6. A process as claimed in claim 5, wherein an agitating and/or heating step is provided between applying each layer.

7. A process as claimed in claim 1, wherein the mixture is applied to the fertilizer particles by mixing in a stirred vessel.

8. A process as claimed in claim 1, wherein the mixture is applied to the fertilizer particles by spraying.

9. A process as claimed in claim 1, wherein the additive comprises a nutrient, an ion exchange agent, a herbicide, a pesticide, or mixtures thereof.

10. A process according to claim 1, wherein said additive comprises a nutrient, said nutrient being selected from the group consisting of elemental sulphur, molybdenum, copper, zinc, boron, iron, manganese, cobalt, selenium, magnesium, calcium or potassium.

11. A process according to claim 10, wherein said nutrient comprises elemental sulphur.

12. A process as claimed in claim 1, wherein the fertilizer particles comprise a fertilizer selected from the group consisting of urea, diammonium phosphate, monoammonium phosphate and triple superphosphate.

13. A process as claimed in claim 1, wherein the coated fertilizer particle contains 0.1 to 30% by weight of additive.

14. A process as claimed in claim 1, wherein the coated fertilizer particle contains 0.5 to 20% by weight of additive.

15. A process according to claim 1, wherein the adhesive comprises an alkali metal lignosulphonate.

16. A process according to claim 1, wherein said additive comprises an ion exchange agent, said ion exchange agent comprising zeolite.

* * * * *